March 13, 1934.  E. E. ALEXANDER  1,950,376
BASKET AND HANDLE THEREFOR
Filed Feb. 18, 1932
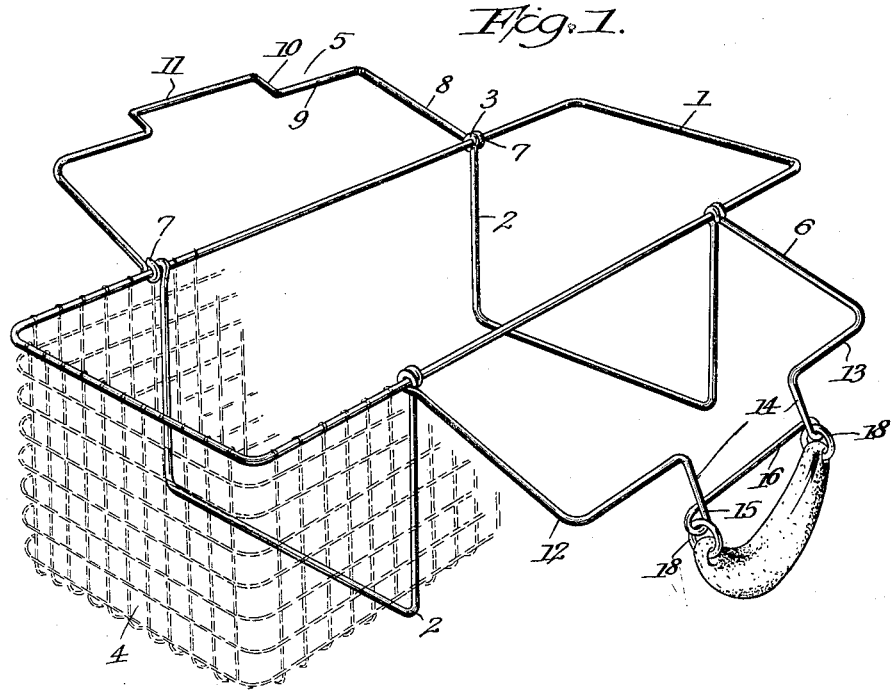
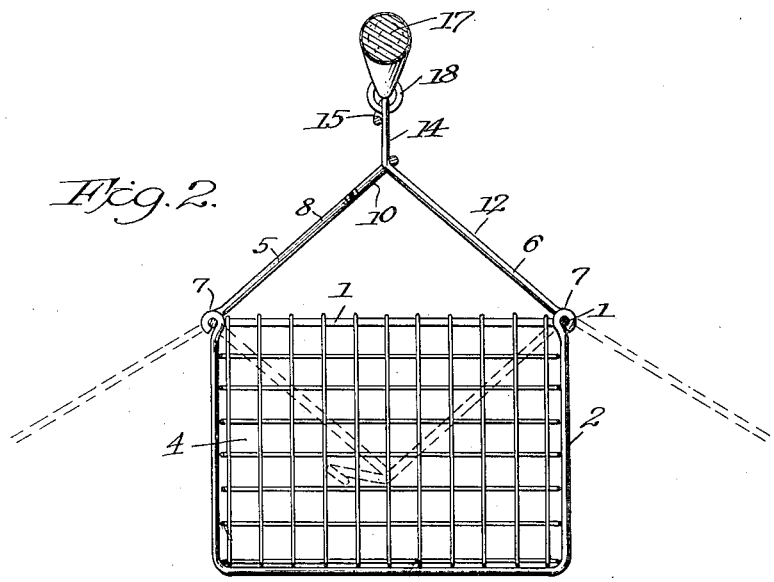
Inventor
Eugene E. Alexander
By Cushman, Darby & Cushman
Attorneys Patented Mar. 13, 1934

1,950,376

UNITED STATES PATENT OFFICE 1,950,376

BASKET AND HANDLE THEREFOR

Eugene Ellsworth Alexander, Freeport, Ill.

Application February 18, 1932, Serial No. 594,349

3 Claims. (Cl. 220—95)

The invention relates to a basket and handle therefor.

The usual basket of the type here disclosed, now in use, has many objectionable features in its construction and disadvantages in its utility. Generally the baskets are entirely too wide so that when carried, the side thereof continually strikes and rubs against the body of the user. To overcome such annoyance, it is necessary to hold the basket away from the user which results in not only an uncomfortable, but tiring, position of the arm.

It appears also that the baskets now in use have handles disposed at right angles to the longitudinal median line of the baskets. Such arrangement requires the arm and hand of the user to assume an exceedingly twisted and awkward position.

To overcome such conditions, I have devised a basket and handle therefor, the advantages of which are manifold.

One of the objects of my invention is to provide a basket and handle therefor in which access to the basket will in no way be obstructed.

Another object of my invention is to provide a basket the handle of which may be folded within the body thereof and thereby facilitate packing of the baskets for transportation or other purposes.

Another object of my invention is to provide a basket, the handle of which is positioned longitudinally thereof and which when properly gripped and held, maintains the basket remote from the user and the arm and hand assume a natural position rather than a twisted or awkward position.

Another object of my invention is to provide a basket the handle of which is so attached to the basket that the balance is evenly distributed and end swinging or swaying while being carried is prevented.

Another object of my invention is to provide a basket and handle therefor which will when in operative position not unlock to allow falling of the basket.

Still another object of my invention is to provide a basket and handle therefor which is of simple construction and very inexpensive to manufacture.

With these and other objects and advantages in mind, attention is called to the drawing in which:

Figure 1 is a perspective view of the basket and handle therefor, and

Figure 2 is a cross sectional view taken through the center of the handle.

Referring more particularly to the drawing in which like numbers indicate like parts, the frame of the basket comprises the substantially rectangular portion 1 and the side and bottom portions 2 which are attached at both ends in any suitable manner to the portions 1 as at 3.

Wire mesh or any other suitable cover 4 for the frame is attached thereto in any well known manner.

The shape of the frame, while disclosed as substantially rectangular, may, it is understood, assume various configurations in any one or all of the dimensions of length, width, and depth.

The handle comprises, generally, two bail members 5 and 6 having their free ends attached to the sides of the frame as at 7 and closed ends adapted to fold within the basket, swing outwardly away from the basket and be interlocked above the basket to form the carrying means therefor. In the forms here disclosed, the bail members consist of single lengths of suitable wire materials. It will be noted that the points of attachment of the bail member indicated at 7 are outside of the points of attachment of the side and bottom portions 2 indicated at 3. Such construction prevents the inward sliding and springing of the ends of the bail members under stress of heavy loads.

The bail member 5 comprises lower side portions 8 extending substantially at right angles from their pivotal points to inwardly projecting portions or shoulders 9 which extend substantially parallel of the basket frame to upper side portions 10 which are substantially parallel to the lower side portions 8 and terminate at an end portion 11, the latter being substantially parallel to the shoulders 9.

The bail member 6 comprises lower side portions 12 extending substantially at right angles from their pivotal points to inwardly projecting portions or shoulders 13 which extend substantially parallel of the basket frame to upper side portions 14 which are substantially oblique relative to the lower side portions 12. The outer ends of portions 14 are bent upon themselves to form eyes 15 which are connected by an end portion 16. A grip 17 is attached to the eyes 15 by means of rings 18.

It will be noted that the inwardly projecting portions or shoulders 13 of the bail member 6 are slightly longer than the inwardly projecting portions or shoulders 9 of the bail member 5.

To interlock the bails for basket carrying purposes, the two bails are brought toward the center of the basket and bail member 6 is brought up beneath bail member 5 as shown in Figure 2. In this position, the upper side portions 14 of the bail member 6 will be substantially perpendicular and the grip may be easily grasped.

It will be noted that the overall length of the bail members from their pivotal points to the end portions is such as to allow their being folded within the basket, thereby facilitating packing for transportation or other purposes.

When it is desired to have unobstructed view of or access to the contents of the basket, the bail members are disengaged and swung outwardly from the basket as shown in Figure 1.

Attention is called to the position of the pivotal points of the bail members so that perfect distribution of lifting power will be had, thereby facilitating easy balance.

The advantages of the basket and handle therefore are quite obvious and the extreme simplicity in construction and inexpensiveness to manufacture make the invention highly desirable.

It is understood that there are various changes in and modifications of the invention which are contemplated within the scope and spirit of the appended claims.

I claim:—

1. A handle for a basket comprising closed bail members having corners adjacent their upper ends pivotally attached to said basket so as to interlock thereabove for carrying purposes, fold therewithin to facilitate packing of the baskets, and swing outwardly therefrom to permit unobstructed access to the basket, and a grip loosely attached at the corners of the closed end of one of said bail members and positioned longitudinally of the basket and transversely of and above said bail members.

2. A handle for a basket comprising closed bail members having free ends and closed ends provided with corners, said free ends being pivotally attached to the basket and said closed ends interlocking so that one of said closed ends is coincident with the longitudinal median line of said basket and the sides thereof are perpendicular, and a grip loosely attached at the corners of the closed ends of one of said bail members.

3. A handle for a basket comprising bail members having free ends and closed ends, said free ends being pivotally attached to the basket and said closed ends interlocked so that one of said closed ends is coincident with the longitudinal median line of said basket and the sides thereof perpendicular, the said perpendicular sides at their upper ends being bent to form eyes, and a grip loosely attached to said eyes.

EUGENE ELLSWORTH ALEXANDER.